United States Patent [19]
Boyle

[11] 3,896,681
[45] July 29, 1975

[54] UNIVERSAL TRANSFER DEVICE
[75] Inventor: Robert F. Boyle, Parchment, Mich.
[73] Assignee: Prab Conveyors, Inc., Kalamazoo, Mich.
[22] Filed: Dec. 26, 1973
[21] Appl. No.: 428,181

[52] U.S. Cl. .............................. 74/526; 214/1 BC
[51] Int. Cl. .............................................. G05g 5/04
[58] Field of Search ............ 74/526, 815, 818, 819; 214/1 BC

[56] References Cited
UNITED STATES PATENTS
| | | | |
|---|---|---|---|
| 2,967,439 | 1/1961 | Cole | 74/815 |
| 3,631,989 | 1/1972 | McCormick | 214/1 BC X |

Primary Examiner—Samuel Scott
Assistant Examiner—F. D. Shoemaker
Attorney, Agent, or Firm—Dressler, Goldsmith, Clement & Gordon, Ltd.

[57] ABSTRACT

A universal transfer device for performing specific repetitive functions in an industrial environment and comprising a gripper arm means rotatably mounted on a suitable frame and capable of sweeping through a predetermined maximum radian displacement is provided with an intermediate stop means which can be actuated as required to limit said radian displacement in any given instance without a need to reset the maximum radian displacement. High degree of reproducibility of the path travelled by the gripper arm means in several planes is achieved by maintaining a positive force which urges the gripper arm means against a stop at the end of its movement in any particular plane.

7 Claims, 9 Drawing Figures

UNIVERSAL TRANSFER DEVICE

BACKGROUND OF THE INVENTION

This invention relates to a universal transfer device for performing specific, predetermined repetitive movements in transferring manufactured parts or the like.

Devices of this general type are utilized for repetitive movements on production lines, in hazardous situations where "hands off" operations are required under the provisions of the Occupational Safety and Health Act, as well as in hot or otherwise hostile environments. The repetitive movements of the transfer device are predetermined, i.e., certain adjustments or settings are made on the device before it is placed in operation, which adjustments or settings determine the extent of horizontal sweep, vertical sweep, gripper arm rotation and extension, etc. However, in many industrial applications it is desirable to have positive intermediate stop positions which can be placed in service as desired.

It is an object of the present invention to provide an improved universal transfer device having an intermediate stop means which can be placed in service as desired and without shutting down the device.

Another object of this invention is to provide a method for operating an industrial transfer device so as to execute the movements thereof accurately and reproducibly.

Still other objects of this invention will readily present themselves to a skilled artisan upon reference to the ensuing specification, the drawings, and the claims.

SUMMARY OF THE INVENTION

The present invention contemplates an improved universal transfer device provided with an intermediate stop means. The universal transfer device includes a structural frame, an upstanding vertical post means affixed to the structural frame, a stop plate means integral with the vertical post means and normal to the longitudinal axis thereof, a pair of radial stop arms rotatably mounted on the vertical post means and detachably secured to the stop plate means in a peripherally spaced relationship relative to each other, a yoke means rotatably mounted on the vertical post means above the radial stop arms, a pair of spaced stop lugs peripherally mounted on the yoke means for engaging the radial stop arms in abutment at a predetermined radian displacement of the yoke means, a yoke motor means on the structural frame for rotating the yoke means about the vertical post means, and a gripper arm means pivotally mounted on the yoke means. The intermediate stop means provided in the foregoing universal transfer device includes a base housing mounted on the stop plate means, a peripheral stop arm journaled in the base housing for movement through a predetermined arc from a rest position to an intercept position and adapted to engage one of the stop lugs on the yoke means when at the intercept position. A motor means for the peripheral stop arm, usually mounted on the base housing, drivably engages the peripheral stop arm for movement through the aforementioned arc. Control means is operably associated with the peripheral stop arm motor means for energizing this motor means.

A more positive stop and retention of position at the termination of gripper arm sweep in any predetermined plane is achieved by maintaining the motor means driving the gripper arm through a sweep in said plane energized after termination of the sweep so that a stop lug engaging the appropriate stop means is continuously urged against the stop means while the gripper arm executes further movements in another plane of motion.

DESCRIPTION OF THE PREFERRED EMBODIMENTS

Figure 1:
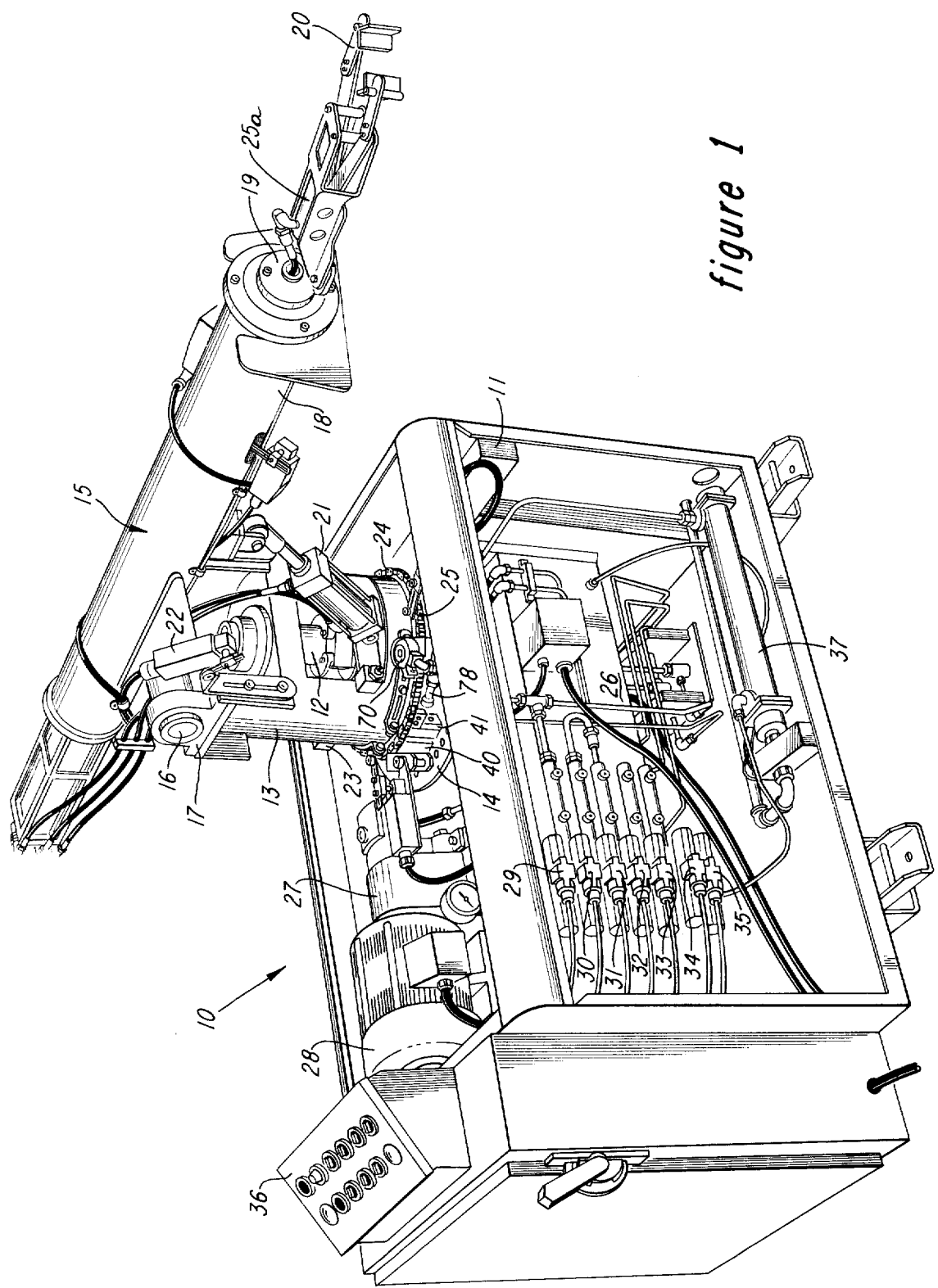
FIG. 1 is a perspective view of a universal transfer device embodying the present invention with frame coverings removed to show interior detail and with the gripper arm in retracted position.

Referring to FIG. 1, universal transfer device 10 comprises structural frame 11 to which is affixed upstanding vertical post 12 with yoke 13 rotatably mounted thereon. Vertical post 12 is also provided with integral stop plate 14 which is normal to the longitudinal axis of vertical post 12.

Gripper arm 15 includes elongated tubular housing 18 pivotally mounted on yoke 13 by means of trunnions, such as trunnion 16 journaled in bearing 17 on yoke 13, and elongated arm member 19 slidably and rotatably mounted within tubular housing 18. Elongated arm member 19 extends beyond tubular housing 18 and external jaws 20 are mounted on the outermost end of arm member 19. If desired, internal jaws can be provided instead. Gripper arm 15 is actuated for a vertical sweep by pivot motor 21 which is a hydraulic cylinder energized from a central hydraulic system as will be discussed in greater detail hereinbelow. Limit switch 22 detects the terminal position of gripper arm 15 during a vertical sweep.

Horizontal sweep of gripper arm 15 is achieved by rotation of yoke 13 by means of hydraulic yoke motor 23 which is operably connected to yoke 13 with a chain-and-sprocket arrangement using chain 24, sprocket 25 on yoke 13 and a similar sprocket of a relatively smaller diameter on the output shaft of yoke motor 23. Similarly, the extension-retraction, as well as the rotation of arm member 19 is effected by hydraulic motors, e.g. hydraulic cylinders, energized from the central hydraulic system.

Jaws 20 are actuated by motor means 25a which can be a hydraulic cylinder energized from the central hydraulic system, a spring-based pneumatic cylinder, or a similar actuating device.

The central hydraulic system comprises reservoir or tank 26 containing the hydraulic fluid or oil, pump 27 which is in communication with tank 26 and is driven by electric motor 28 or similar prime mover means. Pump 27 also communicates with all hydraulic motors, such as yoke motor 23, pivot motor 21 and jaw motor 25a, via suitable hydraulic lines. Motor actuation is effected by means of solenoid-operated control valves 29, 30, 31, 32, 33, 34 and 35 which are energized from control panel 36 or by pre-programmed switching means for automatic operation.

The temperature of the hydraulic fluid in tank 26 is regulated by cooler 37 through which the fluid is circulated in heat-exchange relationship with water or similar cooling medium.

Figure 3:
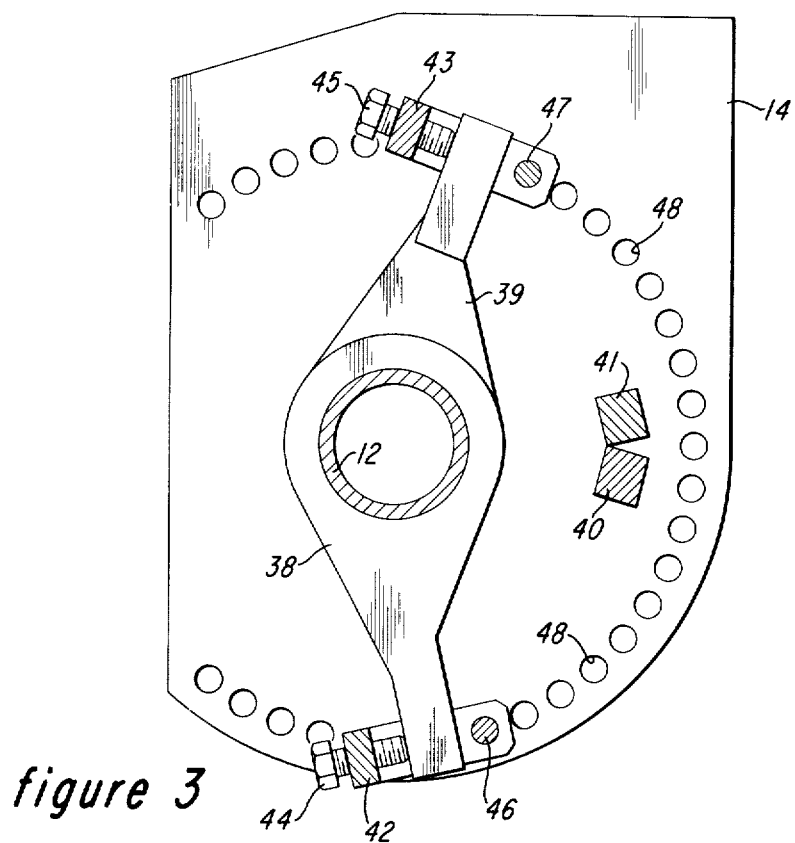
FIG. 3 is a plan view taken along line 3—3 in FIG. 2, partially in section, and showing a stop plate means having a pair of radial stop arms detachably secured thereto and suitable for the mounting of the intermediate stop means.
Figure 2:
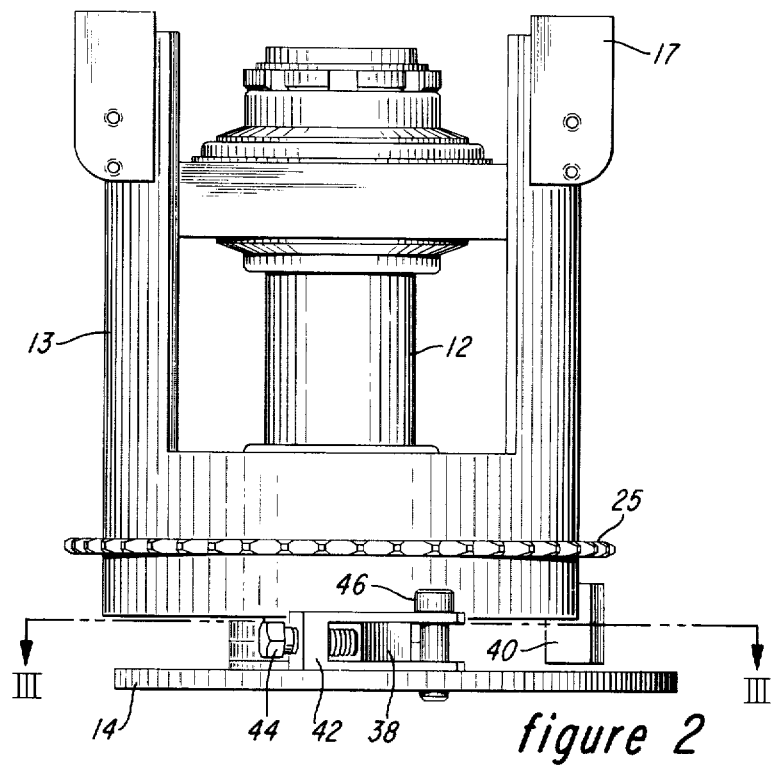
FIG. 2 is an elevational view of a suitable yoke for carrying the gripper arm.

Referring to FIGS. 2 and 3, the extent of radian displacement by yoke 13, i.e., the extent of horizontal sweep by gripper arm 15, is determined by the relative position of radial stop arms 38 and 39 and stop lugs 40 and 41 mounted on the periphery of yoke 13. Stop arms 38 and 39 are rotatably mounted on vertical post 12 and are detachably secured to stop plate 14 by clamps 42 and 43, respectively. Fine adjustment for the positioning of radial stop arm 38 is provided by screw means 44. Similarly, fine adjustment for positioning of radial stop arm 39 is provided by screw means 45. Clamps 42 and 43 are anchored to stop plate 14 by screws 46 and 47 which engage threaded holes in stop plate 14 such as holes 48 provided in an arcuate path.

Figure 4:
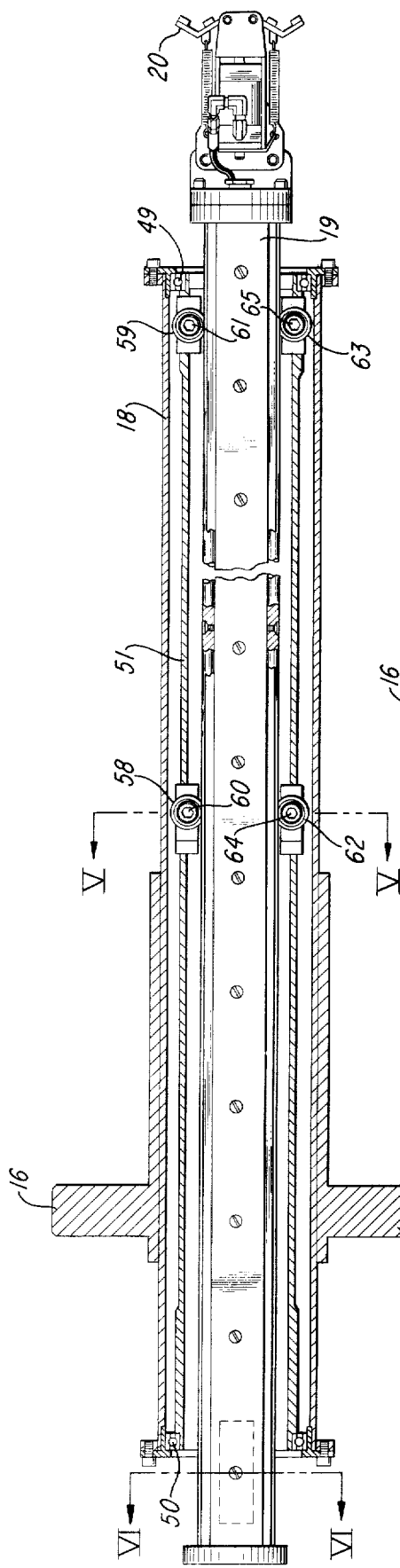
FIG. 4 is a longitudinal sectional elevation of the gripper arm means.
Figure 5:
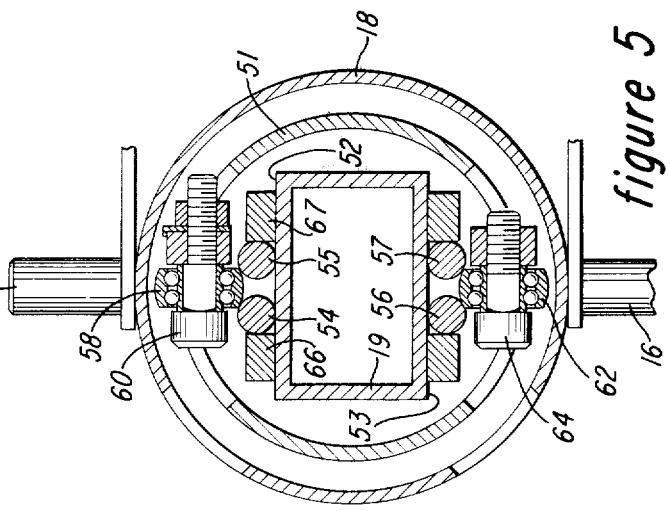
FIG. 5 is a transverse sectional elevation of the gripper arm means taken along line 5—5 in FIG. 4.
Figure 6:
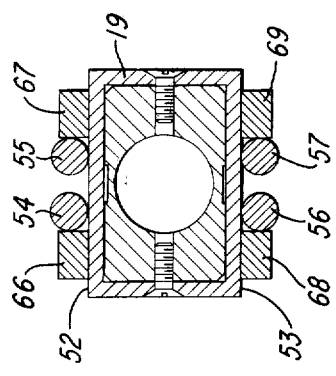
FIG. 6 is a transverse sectional elevation of the gripper arm means taken along line 6—6 in FIG. 4.

A suitable gripper arm assembly is shown in FIGS. 4, 5 and 6. Arm member 19 is slidably received within sleeve 51 which, in turn, is journaled by means of ball bearings 49 and 50 in tubular housing 18. During a vertical sweep housing 18 is pivoted between predetermined housing stops on yoke 13. Arm member 19 is of rectangular cross-sectional configuration and is provided on opposing faces 52 and 53 with longitudinal guide rails such as spaced rails 54 and 55 on face 52 and spaced rails 56 and 57 on face 53. Bearings 58 and 59 track between rails 54 and 55 and are mounted on sleeve 51, which also serves as a bearing support tube. Alignment of arm 19 is conveniently carried out by means of screw eccentrics 60 and 61 which secure bearings 58 and 59 to sleeve 51. In a similar manner bearings 62 and 63 are mounted on sleeve 51 by screws 64 and 65 which can be provided with an eccentric stem, if desired; however, usually it is not necessary to do so. Retainer blocks 66 and 67, positioned adjacent to respective rails 54 and 55 and secured to arm 19, maintain a desired spacing between and alignment of rails 54 and 55. Similarly, retainer blocks 68 and 69 perform the same function for rails 56 and 57.

In the foregoing manner arm member 19 is slidably and rotatably mounted within tubular housing 18 and can be extended, retracted, and/or rotated, to a predetermined extent between appropriate gripper arm or rotational stop means in response to urgings by hydraulic motors such as hydraulic cylinders attached thereto or built within the central cavity of arm 19, in any convenient manner.

Intermediate stop means 70 (FIGS. 1, 7 and 8) for providing an intermittent stop position as required is mounted on stop plate 14 utilizing threaded holes 48. Intermediate stop means 70 comprises base housing 71, peripheral stop arm 72 journaled in housing 71 and extending laterally therefrom, and peripheral stop arm motor 73 mounted on housing 71. Peripheral stop arm 72 is provided with transverse integral shaft 74 which engages roll pin 75 of motor output shaft 76 in a slot provided for that purpose at the upper end of shaft 74. Retainer bearing 77 is utilized to maintain shaft 74 in place. Peripheral stop arm motor 73 preferably is a rotary solenoid energized by means of a conventional control circuit; however, any other convenient motor means can be utilized.

Preferably, stop arm 72 is provided with extendable terminal portion 78 which can be adjusted to the desired length for engaging a stop lug such as lug 40 or lug 41 on yoke 13. Terminal portion 78 is threaded and engages an appropriate threaded opening 79 in stop arm 72. Retainer nut 80 locks terminal portion 78 in place at the desired degree of extension.

Figure 7:
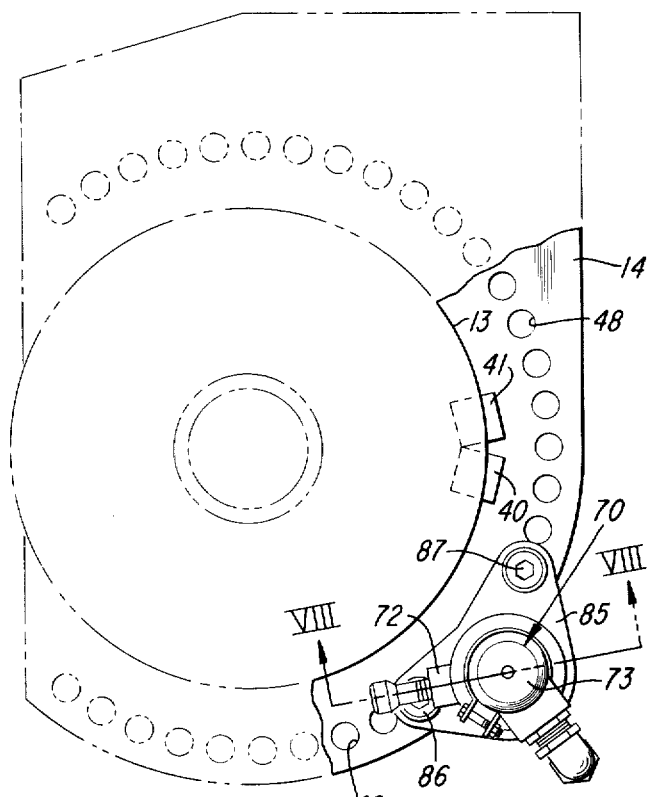
FIG. 7 is a partial plan view showing the stop plate and an intermediate stop means mounted in place.
Figure 8:
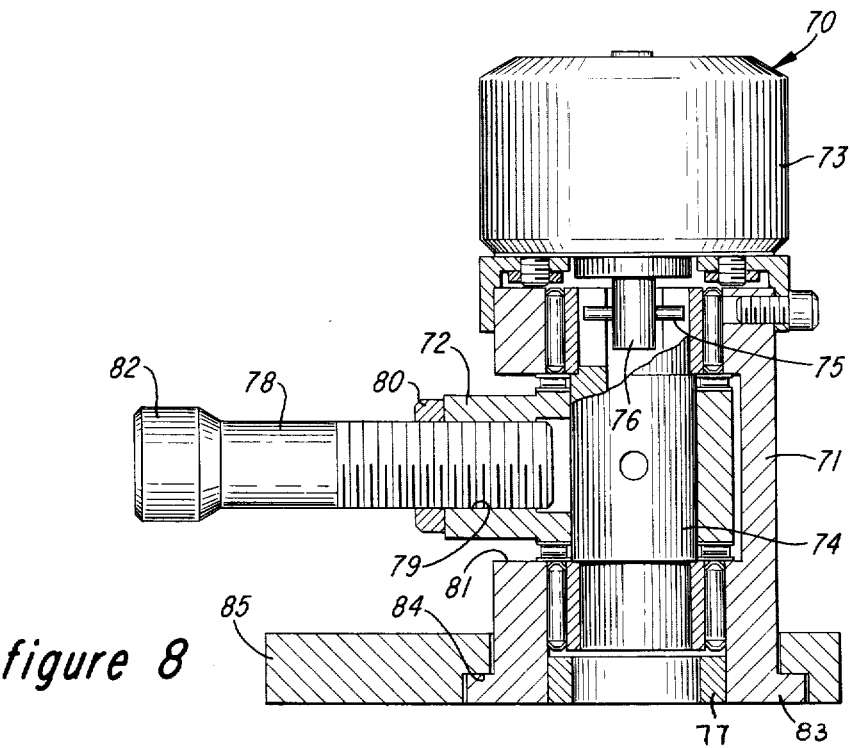
FIG. 8 is an elevational view, partly in section, showing the intermediate stop means of this invention.

Cut-out 81 in the sidewall of base housing 71, through which peripheral stop arm 72 extends, also provides convenient stop means which limit the sweep of stop arm 72 from a rest position as shown in FIG. 7 to an intercept position which is assumed after a clockwise rotation of about 90° from the position shown. In the intercept position, enlarged head 82 engages stop lug 40 as yoke 13 is rotated in a clockwise direction from the position shown in FIG. 7. Of course, by suitably positioning intermediate stop means 70 on stop plate 14, peripheral stop arm 72 can be made to engage stop lug 41 when yoke 13 is rotated in a counterclockwise direction.

For mounting on stop plate 14, housing 71 is provided with outwardly extending flange 83 which is complementary to chamfer or groove 84 in clamp plate 85. When clamp plate 85 is bolted down onto stop plate 14 by means of bolts 86 and 87, intermediate stop means 70 is rigidly secured in the desired position and is ready for use.

Figure 9:
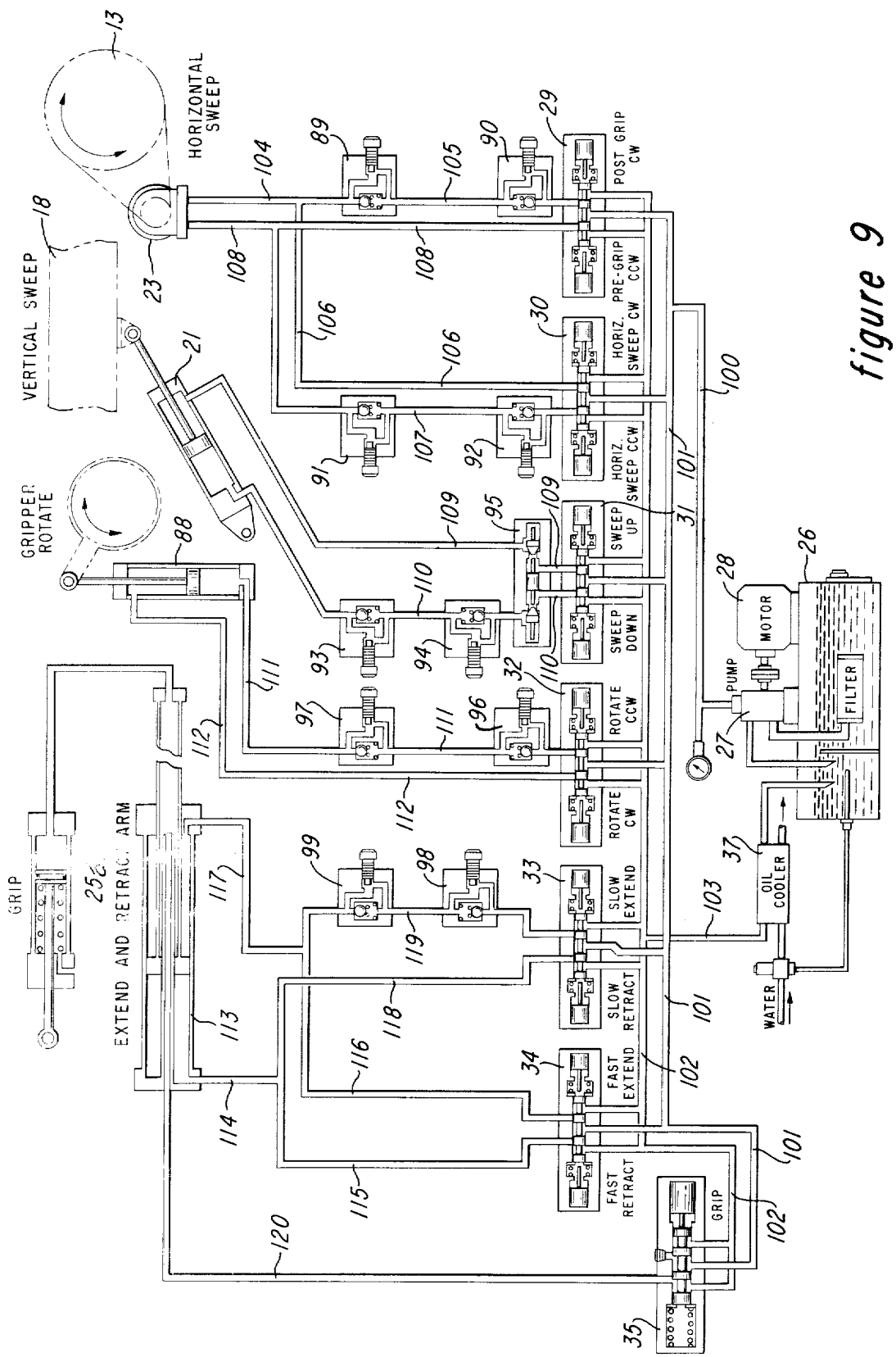
FIG. 9 is a hydraulic schematic of a universal transfer device embodying this invention.

The hydraulic system for the universal transfer device of this invention is schematically set forth in FIG. 9. The system utilizes tank 26 containing an appropriate hydraulic fluid which is circulated through the system by pump 27 driven by means of electric motor 28. Hydraulic lines 100 and 101 comprise a fluid input manifold which communicates with the several hydraulic loops. Hydraulic lines 102 and 103 comprise a fluid return manifold which communicates with the several hydraulic loops and serves to gather hydraulic fluid and return it to tank 26.

The hydraulic loop for effecting a horizontal sweep by gripper arm 15, i.e., for energizing yoke motor 23 comprises lines 104, 106, 107 and 108 with flow control valves 91 and 92 being provided in line 107. Timing and direction of fluid flow is controlled by solenoid-actuated four-way valve 30. Inasmuch as it is desirable in some instances to have available a selection of sweep velocities, a parallel hydraulic loop comprising lines 104, 105 and 108 and controlled by valve 29 is also provided. By pre-setting flow control valves 89 and 90 in line 105 to a different value vis-a-vis control valves 91 and 92 in line 107 two different sweep velocities are available by appropriate energization of control valve 29 or control valve 30, as desired.

The hydraulic loop for effecting a vertical sweep by gripper arm 15, i.e., for energizing hydraulic pivot motor 21, comprises lines 109 and 110 with flow control valves 93 and 94 provided in line 110. Pilot check values 95 are also provided in lines 109 and 110 in order to provide a positive shut-off during setting-up operations and at other times when hydraulic pump 27 is not operating. Pilot check valves 95 prevent the gripper arm assembly from shifting position because of leakage across solenoid-actuated four-way valve 31 in such instances. The timing and direction of fluid flow is controlled by valve 31.

Arm 19 and thus jaws 20 are rotated by rotation motor 88 the hydraulic cylinder of which is pivotally linked to sleeve 51 (FIG. 4) so as to rotate sleeve 51 and arm 19 carried within it. Rotation motor 88 is energized via hydraulic loop comprising lines 111 and 112. Flow control valves 96 and 97 are provided in line 111, and the timing and direction of fluid flow is controlled by solenoid-actuated four-way valve 32.

Extension and retraction of arm 19 is effected by gripper arm motor 113 which can be energized for fast retraction and/or extension via lines 114, 115, 116 and 117, the fluid flow being controlled by solenoid-actuated four-way valve 34. Altenatively, gripper arm motor 113 can be energized for relatively slower retraction and/or extension via lines 114, 118, 119 and 117. In this case flow control valves 98 and 99 are provided in line 119 and fluid flow within the loop is controlled by solenoid-actuated four-way valve 33.

Opening and closure of jaws 20 is obtained by energization of jaw motor 25a via line 120 and solenoid-actuated valve 35. Inasmuch as jaws 20 are spring-biased to return to the open position, line 120 serves as a hydraulic fluid return line when a given transfer operation has been completed and the grip is released by changing the valving position of valve 35 so as to provide communication between line 120 and line 102.

In operation of the universal transfer device in accordance with the present invention positive hydraulic fluid pressure is maintained in each loop from the time a particular motion, e.g., horizontal sweep, is initiated until the point in time when the same motion is commenced in the opposite direction. That is, at the end station for a given sweep or extension, when a moving stop lug or the like engages and abuts a stationary stop, positive hydraulic pressure is maintained within the loop so as to continue to urge the lug or the like against the stop. In this manner a so-called "hard stop" is achieved which obviates undesirable movement or bounce at the end station for a particular movement.

Thus, during a horizontal sweep yoke motor 23 is energized and rotates yoke 13 until stop lug 40 engages radial stop arm 38 or peripheral stop arm 72, whatever the case may be. However, even though no further radian displacement of yoke 13 is possible, valve 30 is maintained in the open position while gripper arm 15 is subsequently actuated to effect a desired vertical sweep. Similarly, at the end station for such vertical sweep, valve 31 is maintained in the open position so as to maintain gripper arm 15 at the vertical end station by urging against an abutting stop means while arm member 19 is manipulated to the desired degree, and jaws 20 actuated for picking up or setting down a part being transferred. By the same token, the properly positioned arm member 19 is urged against an appropriate stop at its end station, in extended, retracted, or rotationally displaced position, while jaws 20 are being opened or closed.

The foregoing discussion and the accompanying drawings are intended as illustrative and are not to be taken as limiting. Still other variations and rearrangements of parts are possible without departing from the spirit and scope of the present invention.

I claim:

1. In a universal transfer device including a structural frame, an upstanding vertical post means affixed to said structural frame, stop plate means integral with said vertical post means and normal to the longitudinal axis thereof, a pair of radial stop arms rotatably mounted on said vertical post means and detachably secured to said stop plate means peripherally spaced from each other, yoke means rotatably mounted on said vertical post means above said radial stop arms, a pair of spaced stop lugs peripherally mounted on said yoke means for engaging said radial stop arms at a predetermined radian displacement of said yoke means, yoke motor means on said frame for rotating said yoke means about said vertical post means, and gripper arm means pivotally mounted on said yoke means, the improvement which comprises an intermediate stop means including a base housing mounted on said stop plate means, a peripheral stop arm journaled in said base housing for movement through a predetermined arc from a rest position to an intercept position and adapted to engage one of said stop lugs when at said intercept position, peripheral stop arm motor means drivably engaging the journaled peripheral stop arm for movement through said predetermined arc, and control means operably associated with the peripheral stop arm motor means for energizing said perhipheral stop arm motor means.

2. The improvement in accordance with claim 1 wherein said peripheral stop arm motor means is a rotary solenoid.

3. The improvement in accordance with claim 1 wherein said peripheral arm is provided with an extendable terminal portion.

4. The improvement in accordance with claim 1 wherein said base housing is removably mounted on said stop plate means with a clamp plate engaging said base housing and detachably secured to said stop plate means.

5. A method for operating a universal transfer device having a structural frame, an upstanding vertical post means affixed to said structural frame, stop plate means integral with said vertical post means and normal to the longitudinal axis thereof, a pair of radial stop arms rotatably mounted on said vertical post means and detachably secured to said stop plate means peripherally spaced from each other, yoke means rotatably mounted on said vertical post means above said radian stop arms; a pair of spaced stop lugs peripherally mounted on said yoke means for engaging said radial stop arms at a predetermined radial displacement of said yoke means, yoke motor means for rotating said yoke means on said vertical post means, and gripper arm means pivotally mounted on said yoke means, which comprises the steps of energizing said yoke motor means and rotating said yoke means until one of said stop lugs engages a stop arm;

actuating said gripper arm means; and urging the engaged stop lug against the abutting stop arm while said gripper arm means is actuated.

6. The method in accordance with claim 5 wherein said stop lug engages one of said radial stop arms.

7. The method in accordance with claim 5 wherein an intermediate stop means having a peripheral stop arm is provided on said stop plate means and wherein said stop lug is moved in engagement with said peripheral stop arm.

* * * * *

UNITED STATES PATENT OFFICE
CERTIFICATE OF CORRECTION

PATENT NO. : 3,896,681
DATED : July 29, 1975
INVENTOR(S) : Robert F. Boyle

It is certified that error appears in the above-identified patent and that said Letters Patent are hereby corrected as shown below:

Column 2, line 66, "spring-based" should be -- spring-biased --.

Column 4, line 66, "values" should be -- valves --.

Column 6, line 47, "radian" should be -- radial --.

Column 6, line 50, "radial" should be -- radian --.

Signed and Sealed this fourteenth Day of October 1975

[SEAL]

Attest:

RUTH C. MASON
*Attesting Officer*

C. MARSHALL DANN
*Commissioner of Patents and Trademarks*